US012574831B2

(12) United States Patent
Gupta et al.

(10) Patent No.:  US 12,574,831 B2
(45) Date of Patent:     Mar. 10, 2026

(54) METHOD AND SYSTEM FOR DISTRIBUTED DISCOVERY AND NOTIFICATION FOR EDGE COMPUTING

(71) Applicant: SAMSUNG ELECTRONICS CO., LTD., Suwon-si (KR)

(72) Inventors: Nishant Gupta, Bangalore (IN); Basavaraj Jayawant Pattan, Bangalore (IN); Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 710 days.

(21) Appl. No.: 17/754,101

(22) PCT Filed: Sep. 25, 2020

(86) PCT No.: PCT/KR2020/013145
§ 371 (c)(1),
(2) Date: Mar. 23, 2022

(87) PCT Pub. No.: WO2021/060937
PCT Pub. Date: Apr. 1, 2021

(65) Prior Publication Data
US 2022/0369218 A1     Nov. 17, 2022

(30) Foreign Application Priority Data

Sep. 25, 2019  (IN) ............................. 201941038791
Sep. 3, 2020   (IN) ............................. 201941038791

(51) Int. Cl.
*H04W 48/00*        (2009.01)
*H04W 8/18*         (2009.01)
(Continued)

(52) U.S. Cl.
CPC ............. *H04W 48/18* (2013.01); *H04W 8/18* (2013.01); *H04W 60/00* (2013.01)

(58) Field of Classification Search
None
See application file for complete search history.

(56) References Cited

U.S. PATENT DOCUMENTS

| | | | |
|---|---|---|---|
| 10,873,886 B2 | 12/2020 | Shi et al. | |
| 2018/0103013 A1 | 4/2018 | Imai et al. | |
| 2022/0174585 A1* | 6/2022 | Ge ...................... | H04L 61/4541 |

FOREIGN PATENT DOCUMENTS

| | | | | |
|---|---|---|---|---|
| CN | 112187495 A | * | 7/2019 | ......... H04L 41/0813 |
| EP | 3373523 A1 | | 9/2018 | |

OTHER PUBLICATIONS

3GPP TSG-SA WG6 Meeting #37-e, S6-200929.*
(Continued)

*Primary Examiner* — Abdelillah Elmejjarmi

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

Accordingly, embodiments herein disclose a method and system for distributed discovery and notifications for edge computing. The method includes receiving, by an edge configuration server (ECS) (116), an information profile of at least one edge application server (EAS) (112) provided by a source edge enabler server (EES) (14A) from a plurality of EESs (114). The EAS (112) is registered with the source EES (114A), Further, the method includes determining, by the ECS (116), at least one target EES (114B) of the plurality of EESs (114) based on the information profile of the at least (Continued)

one EAS (112). Further, the method includes sending, by the ECS (116), at least one notification to the at least one target EES (114B). The at least one notification includes information about the source EES (114A), and the information profile of the at least one EAS (112).

8 Claims, 12 Drawing Sheets

(51) Int. Cl.
 *H04W 48/18* (2009.01)
 *H04W 60/00* (2009.01)

(56) References Cited

OTHER PUBLICATIONS

3GPP TR 23.758 V1.0.0 (Sep. 2019).*
International Search Report and Written Opinion of the International Searching Authority in connection with International Application No. PCT/KR2020/013145 issued Jan. 12, 2021, 9 pages.
3GPP TR 23.758 V1.0.0 (Sep. 2019) Technical Report; 3rd Generation Partnership Project; Technical Specification Group Services and System Aspects; Study on application architecture for enabling Edge Applications; (Release 17); 80 pages.
Alibaba Group, "Pseudo-CR on New solution—Service Continuity for Edge Computing Service" 3GPP TSG-SA WG6 Meeting #32, S6-191327(revision of S6-XXXXXX), Roma, Italy, Jul. 8-12, 2019, 3 pages.
Huawei et al., "Solution for Edge enabler server registration" 3GPP TSG-SA WG6 Meeting #33, S6-191897(revision of S6-191779), Sophia Antipolis, France, Sep. 2-6, 2019, 7 pages.
Convida Wireless LLC, "Key Issue #9 Solution on Preserving Service Continuity" 3GPP TSG-SA WG6 Meeting #33, S6-191640, Sophia Antipolis, France, Sep. 2-6, 2019, 4 pages.
Hearing Notice dated Aug. 21, 2025, in connection with Indian Application No. 201941038791, 3 pages.
Office Action dated Aug. 22, 2025, in connection with Korean Application No. 10-2022-7013861, 12 pages.
Office Action dated Dec. 31, 2025, in connection with Indian Application No. 201941038791, 9 pages.

* cited by examiner

[Fig. 1]
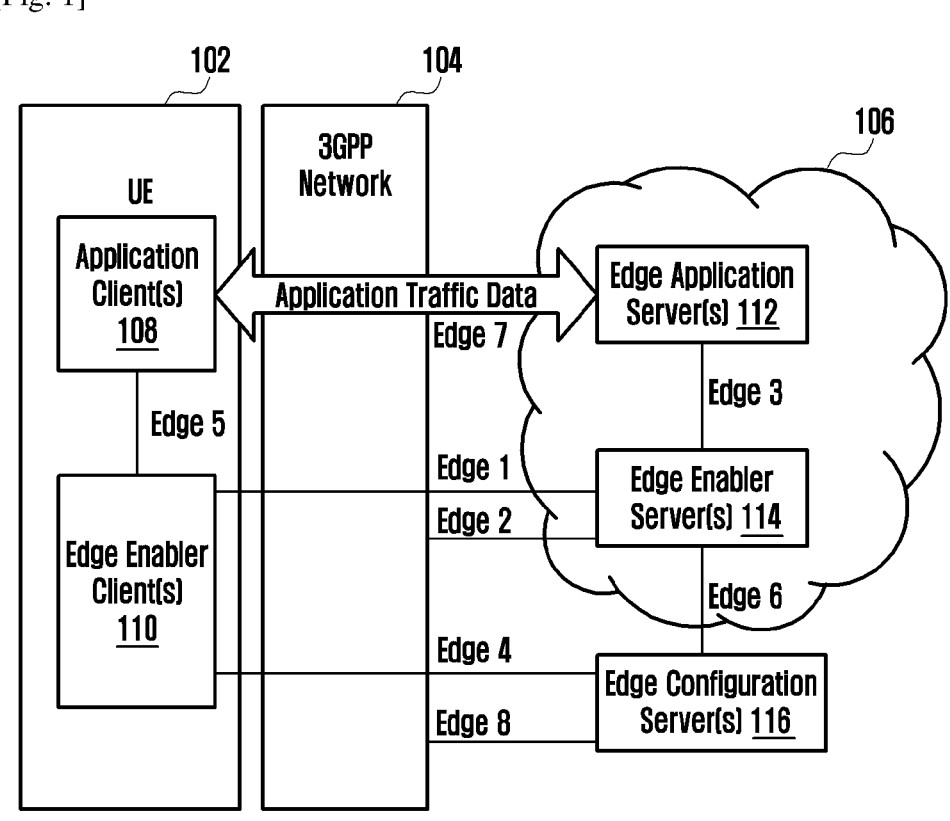

[Fig. 2]
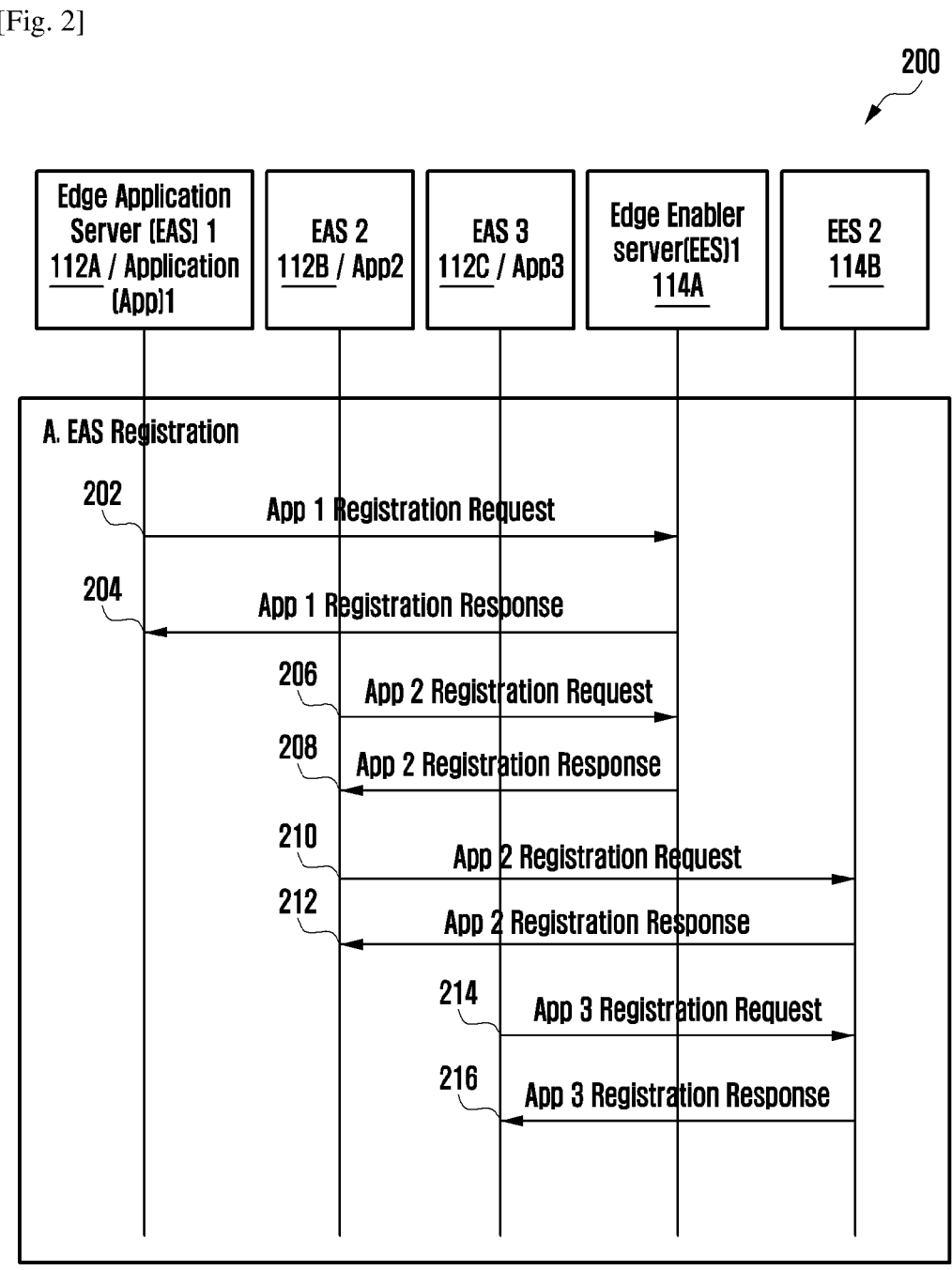

[Fig. 3]
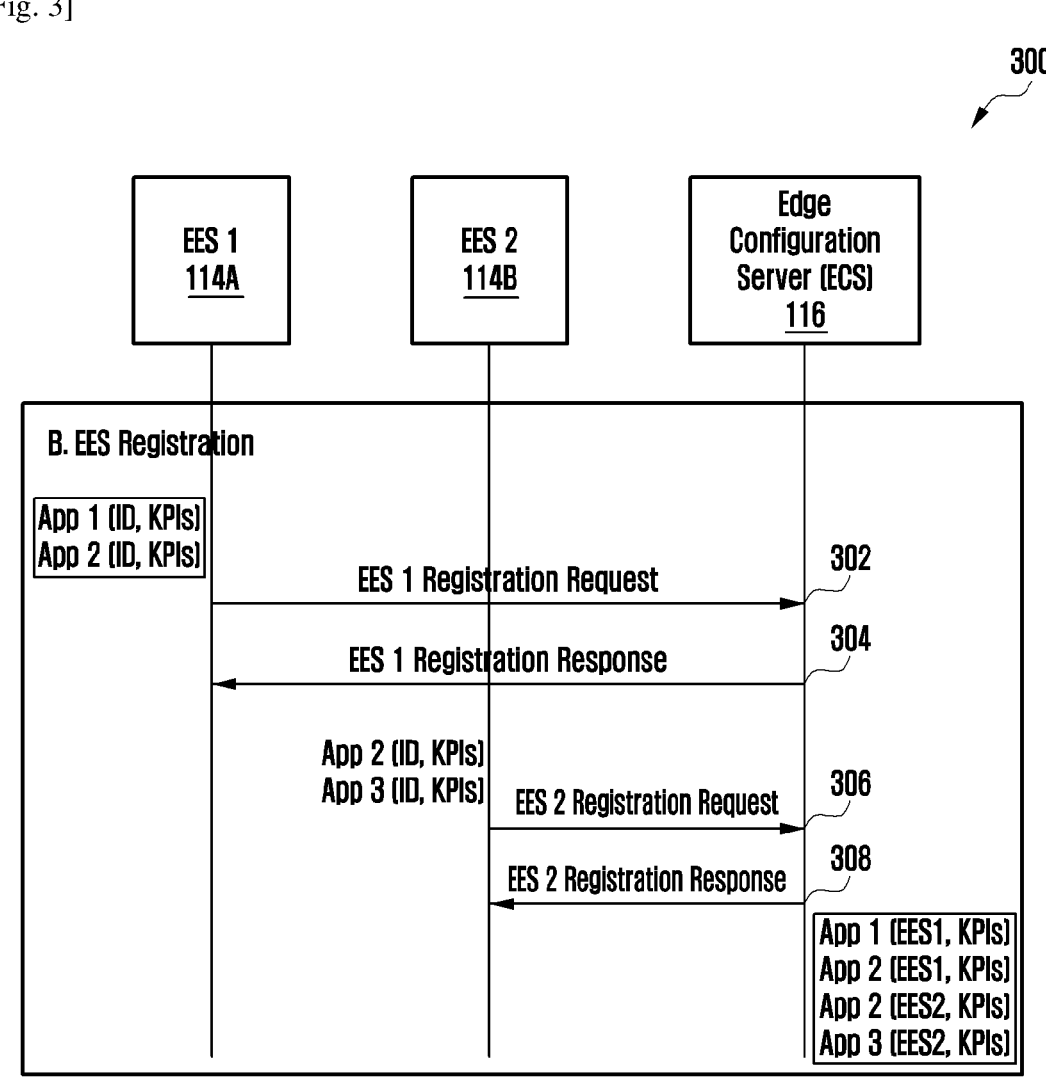

[Fig. 4A]
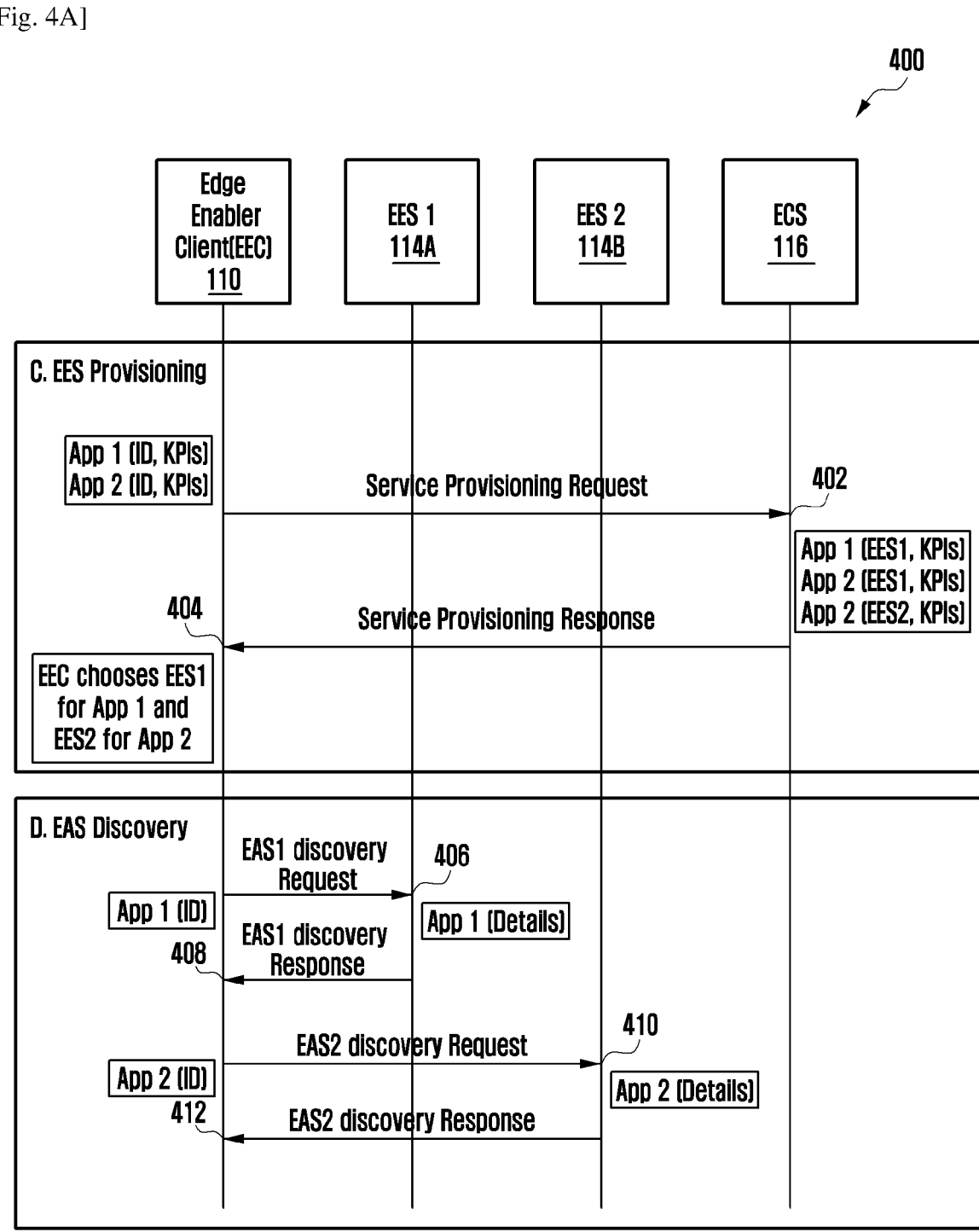

[Fig. 4B]
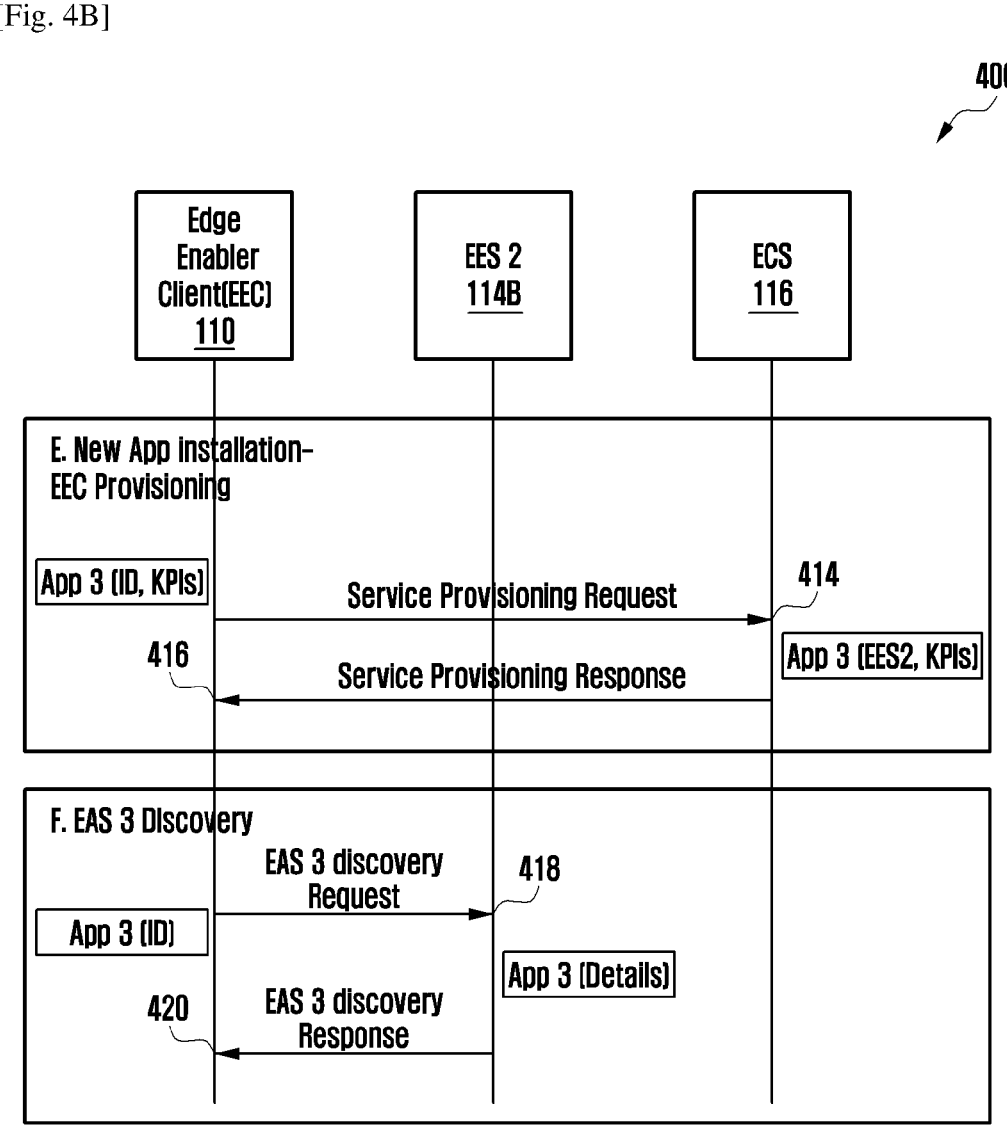

Figure 5A:
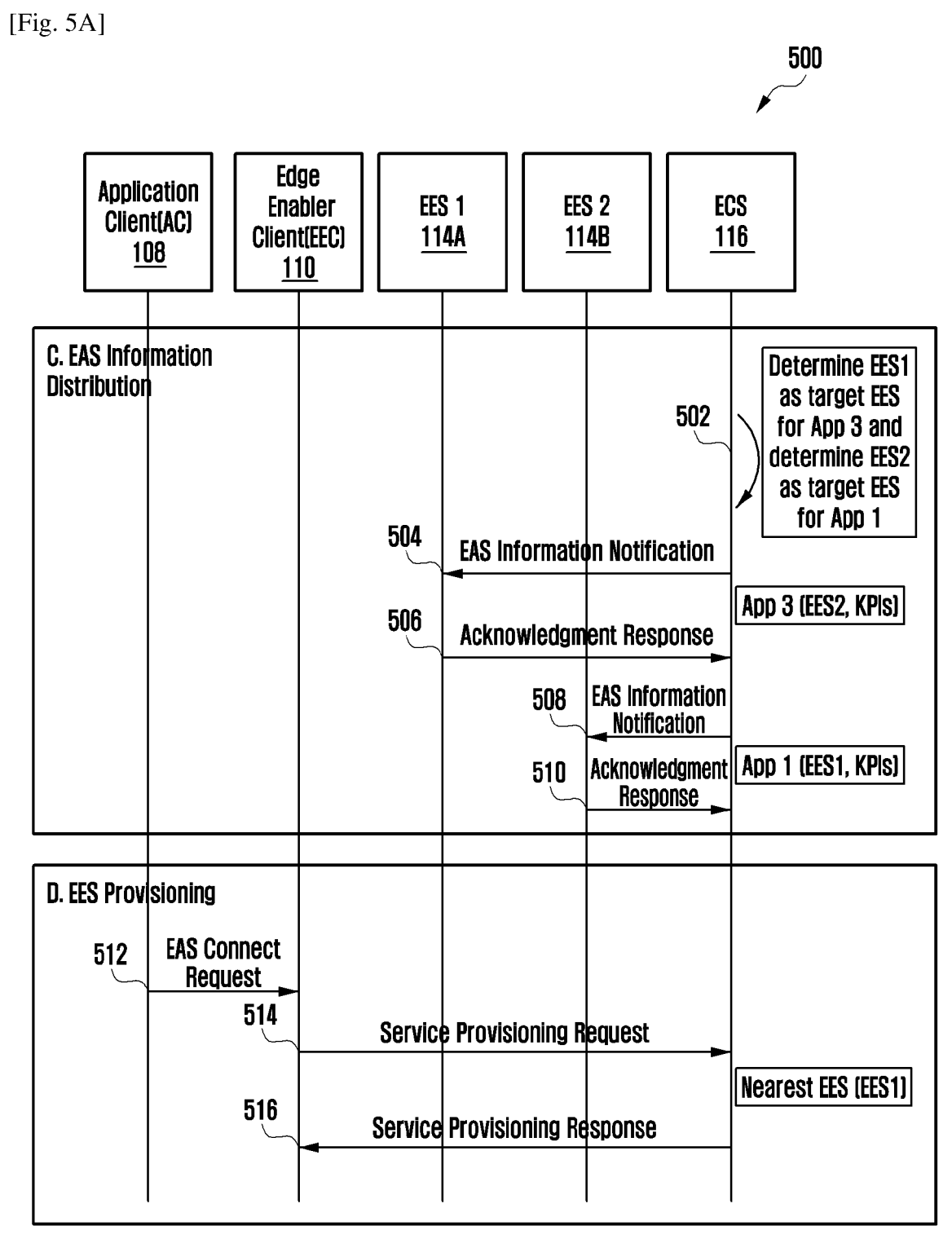

| Application Client(AC) 108 | Edge Enabler Client(EEC) 110 | EES 1 114A | EES 2 114B | ECS 116 |

C. EAS Information Distribution

502 — Determine EES1 as target EES for App 3 and determine EES2 as target EES for App 1

504 — EAS Information Notification

App 3 (EES2, KPIs)

506 — Acknowledgment Response

508 — EAS Information Notification

App 1 (EES1, KPIs)

510 — Acknowledgment Response

D. EES Provisioning

512 — EAS Connect Request

514 — Service Provisioning Request

Nearest EES (EES1)

516 — Service Provisioning Response

[Fig. 5B]
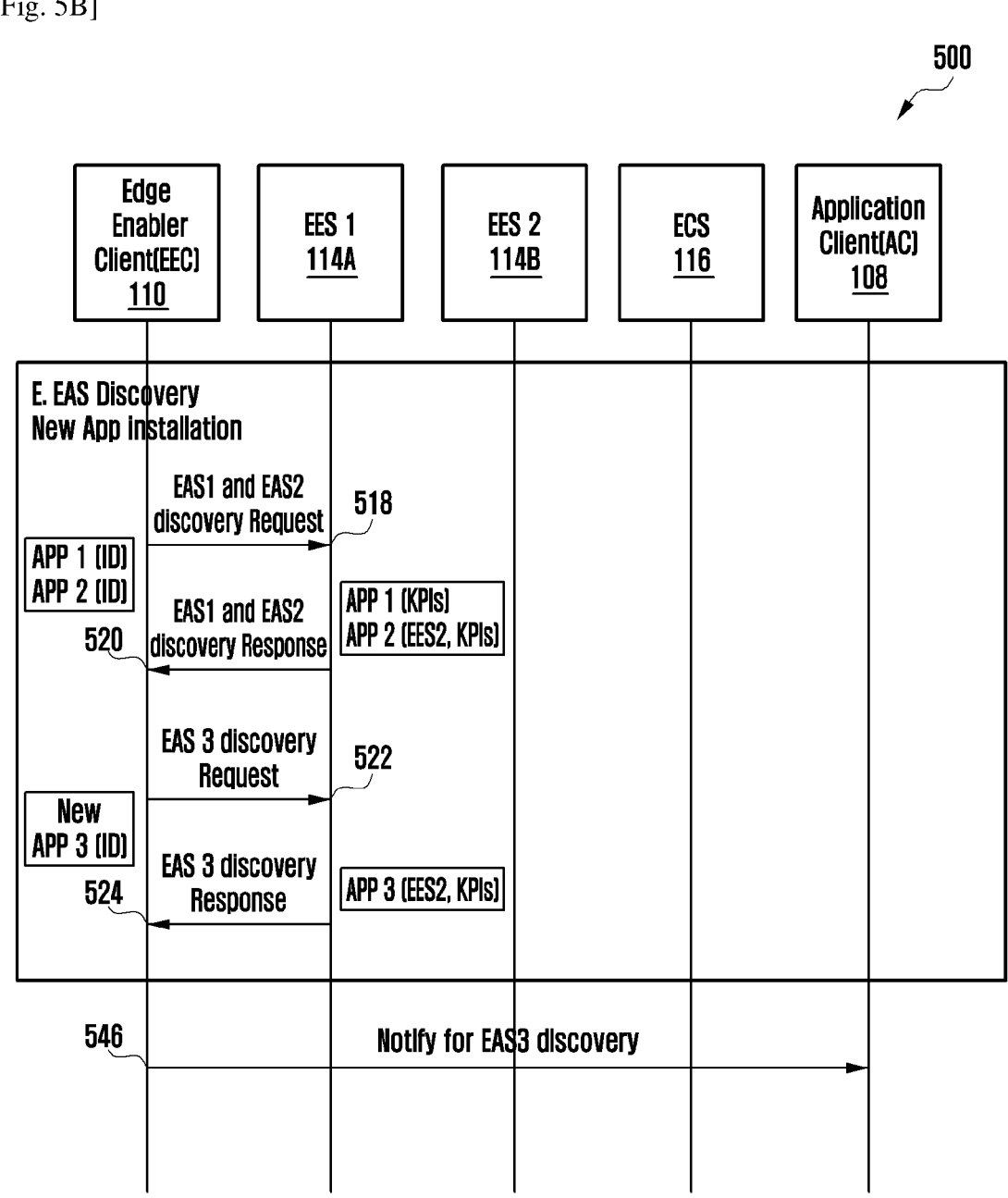

[Fig. 6]
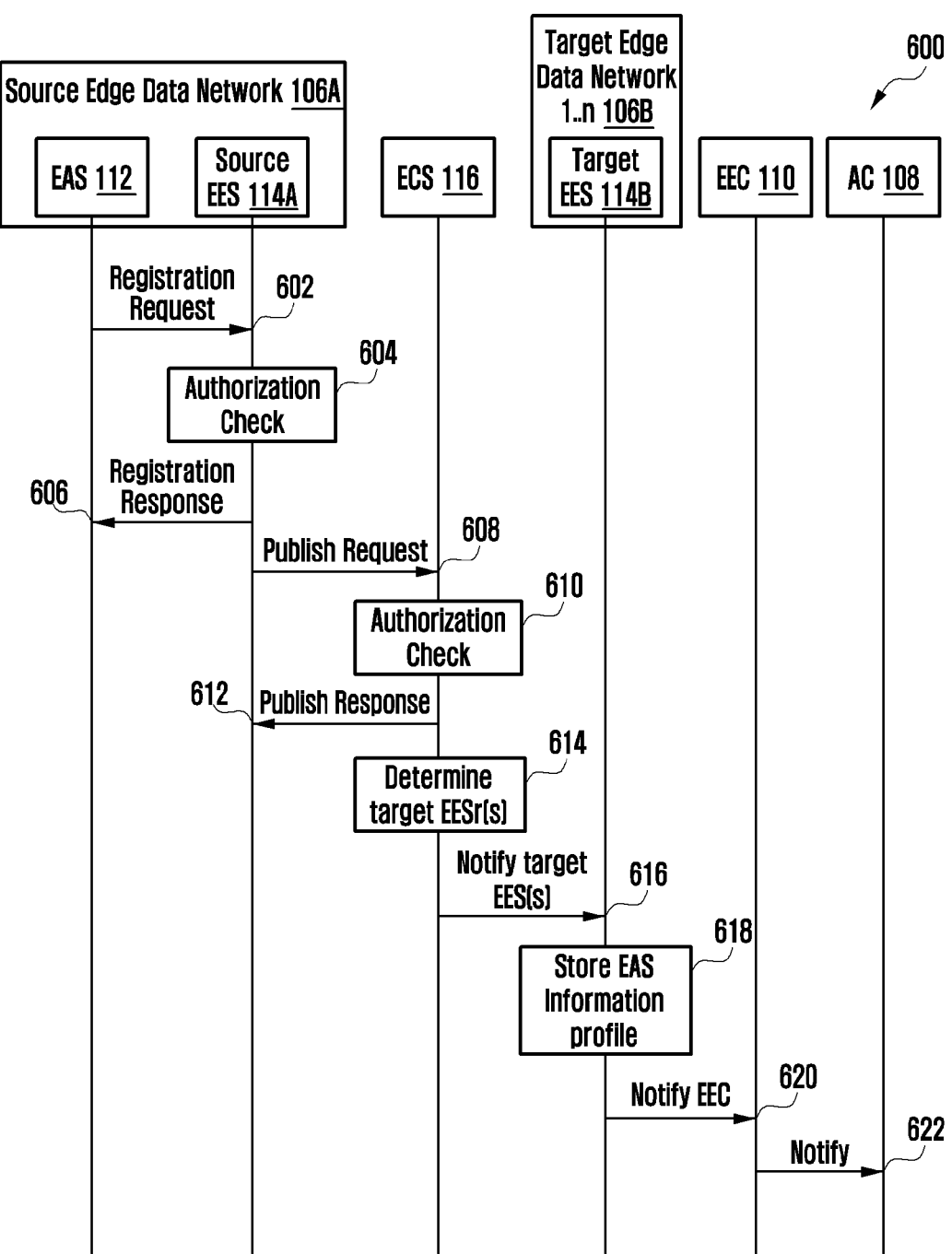

[Fig. 7]
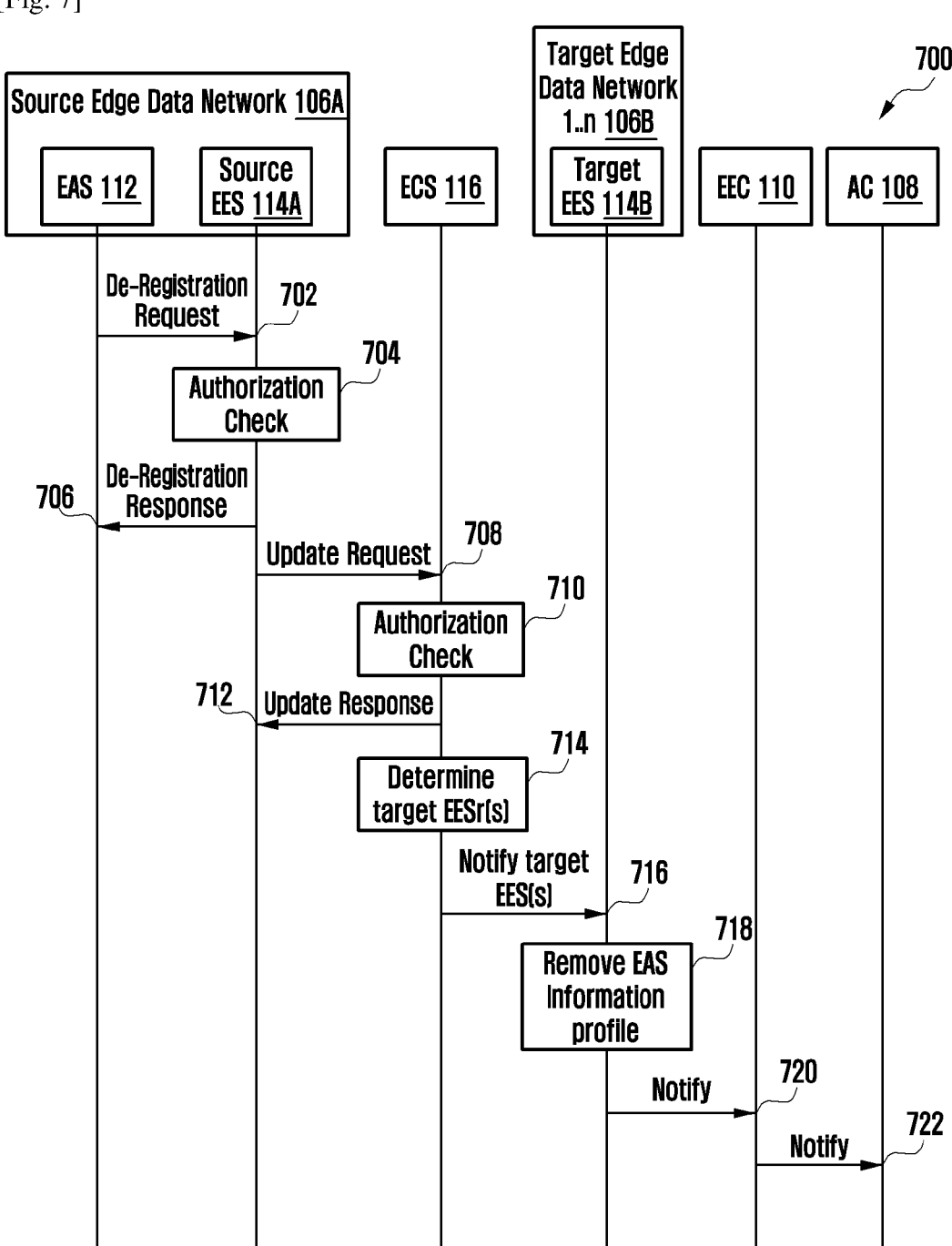

[Fig. 8]
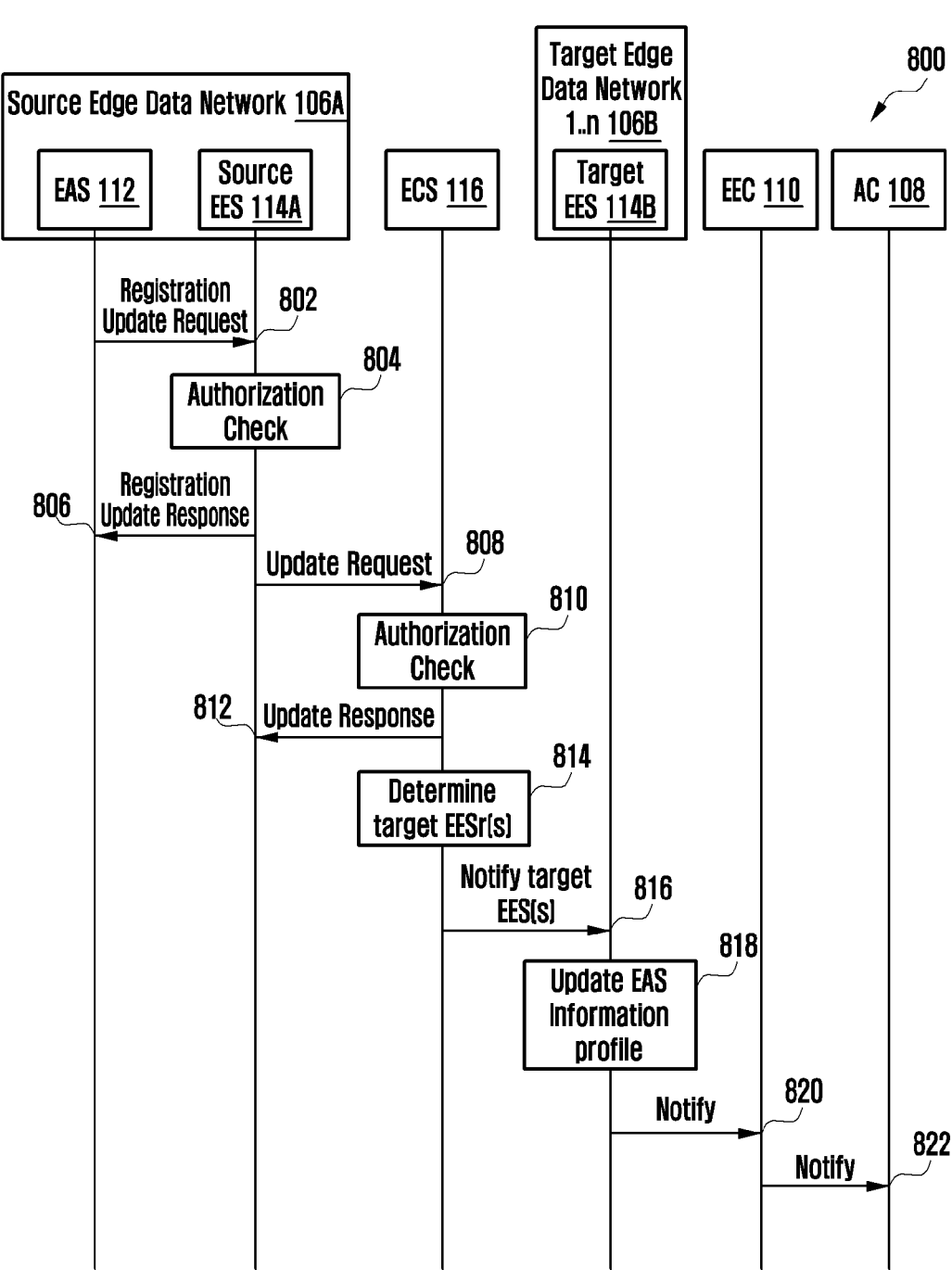

[Fig. 9]
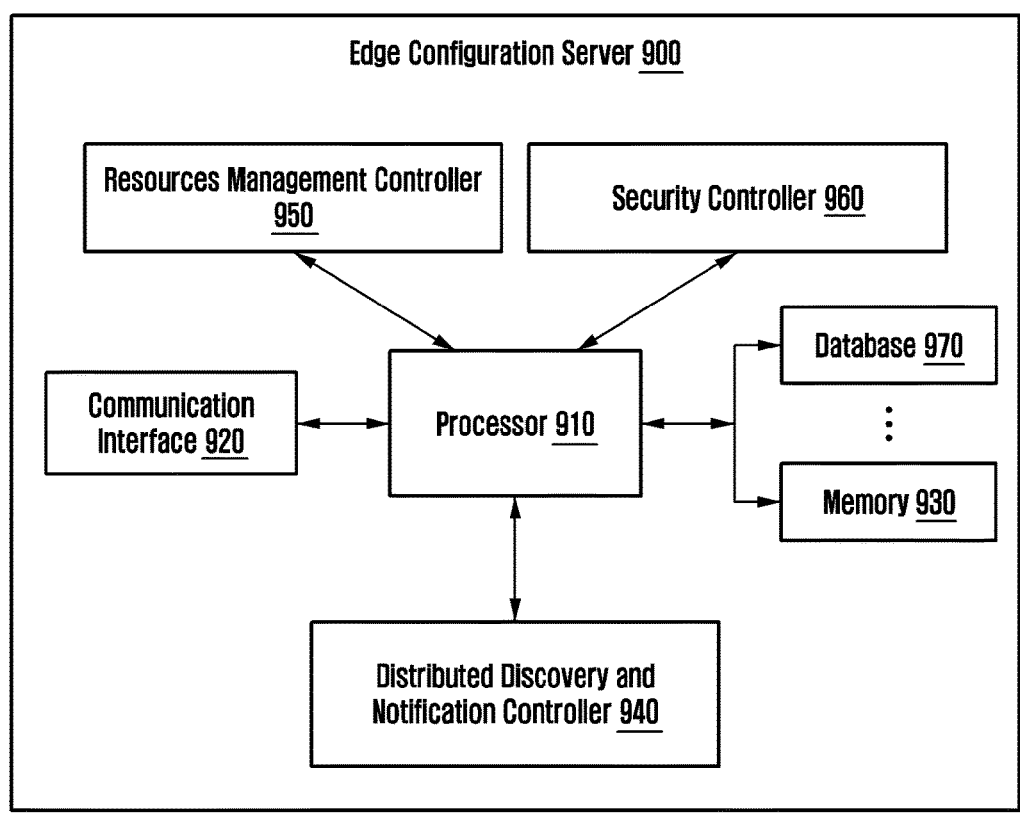
[Fig. 10]
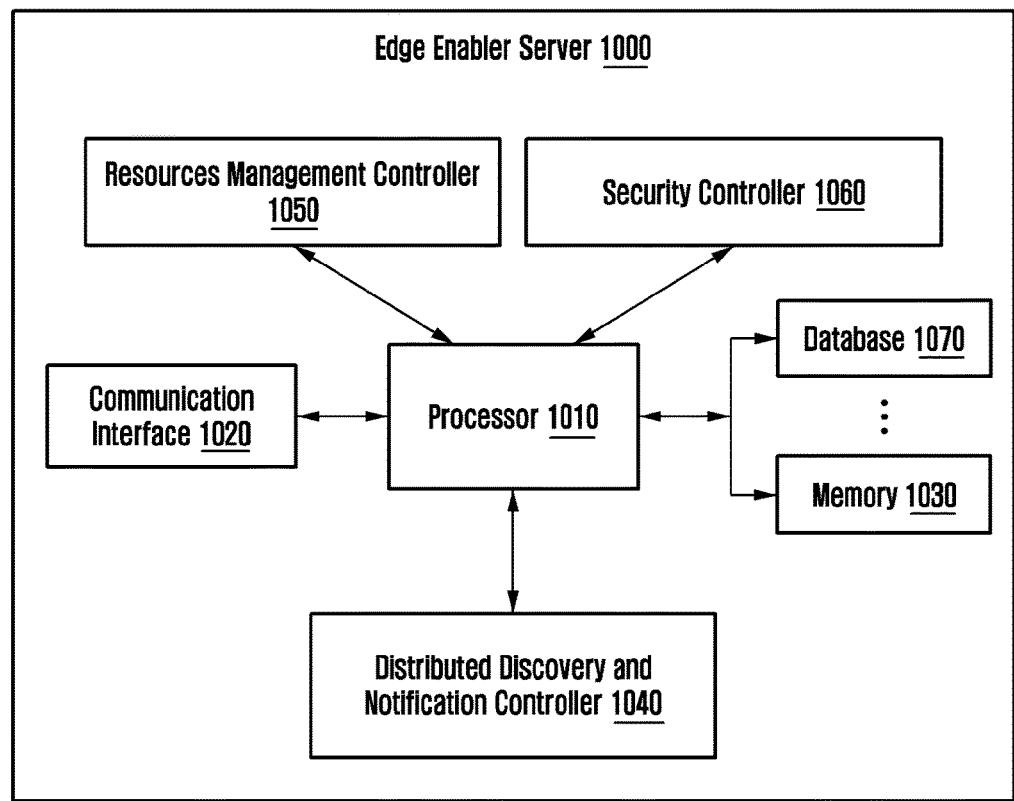

[Fig. 11]
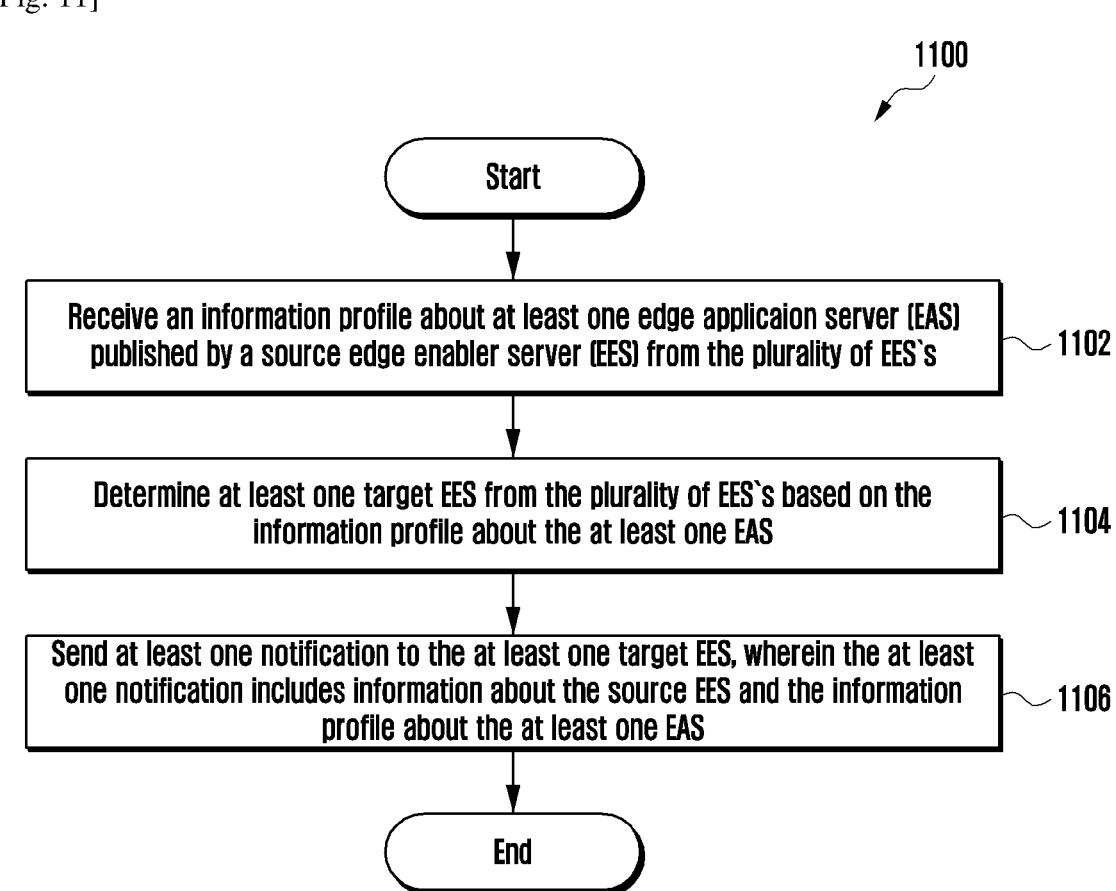

METHOD AND SYSTEM FOR DISTRIBUTED DISCOVERY AND NOTIFICATION FOR EDGE COMPUTING

CROSS-REFERENCE TO RELATED APPLICATIONS

This application is a 371 of International Application No. PCT/KR2020/013145, filed Sep. 25, 2020, which claims priority to Indian Patent Application No. 201941038791, filed Sep. 25, 2019 and Indian Patent Application No. 201941038791, filed Sep. 3, 2020, the disclosures of which are herein incorporated by reference in their entirety.

BACKGROUND

1. Field

The present disclosure relates to edge computing, and more specifically related to a method and a system for distributed discovery of edge related information in an edge computing network system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANS), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

The development of edge computing in wireless communication has transformed the way of handling and processing data across millions of devices around the world. The massive growth of artificial intelligence and internet of things (IoT) has played role of fuel to drive development of edge-computing network systems. Edge computing supports new applications demanding real-time computing power because of capabilities such as lower latency, higher bandwidth, and reduced backhaul traffic. The applications like VR gaming, autonomous vehicles, robotics, video processing, and network assisted processing rely heavily on the edge computing capabilities.

However, deploying applications on network edges, called edge data networks (EDNs), is costlier than deploying the same applications on the cloud, due to limited resources and high operational costs associated with the EDNs. Each EDN includes edge enabler servers (EESs) each for managing the application servers, called edge application servers (EASs) deployed in the EDNs. Given the cost barrier, an application developer may choose to deploy limited edge application servers in limited set of EDNs. The cost may also vary depending on how close the deployed EDNs are to the consumers (hereinafter also referred as, user equipment (UE)). Accordingly, a service provider, such as mobile network operator, may charge the consumers differently based on how 'close' the edge application server is available to the consumer. Therefore, there arises certain situation which may require discovery of EAS across multiple EDNs. For example, the closest EDN to which the UE is connected may not have a particular EAS required by the UE. In such scenarios, there arises a need to discover the information about the availability of the aforementioned EAS in other EDNs.

There can be multiple mechanisms to enable such a discovery such as having a common centralized server which is aware of all the deployments of edge application servers within all EDNs, with their applicability across geographies. However, this can be an overloaded task for the centralized server, given that the deployments of the applications on edge is dynamic and so is their availability. Further, directing service request to the centralized server for every discovery of a new edge application server increases latency and response time and thus, adversely impacts user experience.

In view of the above, there is a need of a system or method to provide edge application server information across EDNs in a distributed environment.

Thus, it is desired to address the above mentioned disadvantages or shortcomings or at least provide a useful alternative.

Accordingly, embodiments herein disclose a method for distributed discovery and notifications for edge computing in an edge data network system.

The method includes receiving, by an edge configuration server (ECS), an information profile of at least one edge application server (EAS) provided by a source edge enabler server (EES) from a plurality of EESs. Further, the method includes determining, by the ECS, at least one target EES of the plurality of EESs based on the information profile of the at least one EAS. Further, the method includes sending, by the ECS, at least one notification to the at least one target EES. The at least one notification includes information about the source EES, and the information profile of the at least one EAS provided by the source EES.

In an embodiment, the information profile of the at least one EAS comprises at least one of a list of service areas served by the at least one EAS, an endpoint of the at least one EAS, a registration information of the at least one EAS, and an identifier of the at least one EAS.

In an embodiment, the at east one notification comprises at least one of an identifier of the source EES, and the information profile of the at least one EAS.

In an embodiment, the method determines the at least one target EES by determining whether the service area of the at least one EAS (112) overlaps with at least one of a location and a service area of the at least one target EES (114B), and selecting the at least one target EES based on the overlap between the service area of the at least one EAS, and the at least one of the location and the service area of the at least one target EES.

In an embodiment, the method further includes receiving, by the at least one target EES, the at least one notification from the ECS.

In an embodiment, the method further includes sending, by the at least one target EES, at least one notification to at least one edge enabler client (EEC).

Accordingly, embodiments herein disclose an edge data network system for distributed discovery and notification for edge computing. The edge data network system includes at least one edge application server (EAS), at least one edge enabler servers (EESs) communicatively connected to the at least one EAS, and an edge configuration server (ECS), communicatively connected to the plurality of EESs. The ECS includes a memory, a processor and a distributed discovery and notification controller, communicatively connected to the memory and the processor. The distributed discovery and notification controller is configured to receive an information profile of the at least one edge application server (EAS) provided by a source edge enabler server (EES) from the plurality of EESs. Further, the distributed discovery and notification controller is configured to determine at least one target EES from the plurality of EESs based on the information profile of the at least one EAS. Further, the distributed discovery and notification controller is configured to send at least one notification to the at least one target EES. The at least one notification includes information about the source EES, and the information profile of the at least one EAS. Further, the at least one target EES is configured to receive the at least one notification from the ECS, and send the at least one notification to at least one edge enabler client (EEC).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The principal object of the embodiments herein is to provide a method and a system for strategically distributing discovery information and notifications related to an EAS across EDNs in a distributed edge network environment, and thus eliminating the involvement of a centralized server (hereinafter may also referred as, edge configuration server (ECS)) for each discovery request for new edge application server.

Another object of the embodiment herein is to enable closest EDN (hereinafter may also referred as, source EDN) connected to the UE to fetch discovery information related to the EAS requested by the UE and reconnect the UE to another EDN (hereinafter may also referred as, target (EDN) which is hosting the requested EAS, in order to reduce latency and response time while strategically maintaining limited deployment of EASs in limited set of EDNs.

BRIEF DESCRIPTION OF DRAWINGS

This method and system is illustrated in the accompanying drawings, throughout which like reference letters indicate corresponding parts in the various figures. The embodiments herein will be better understood from the following description with reference to the drawings, in which:

FIG. 1 illustrates a generic architecture of an edge data network system in a distributed environment, according to an embodiment as disclosed herein;

FIG. 2 illustrates a sequential diagram representing a method for registration of multiple EASs with an EES within the system shown in FIG. 1, according to an embodiment as disclosed herein;

FIG. 3 illustrates a sequential diagram representing a method for registration of multiple EESs with an ECS within the system shown in FIG. 1, according to an embodiment as disclosed herein;

FIGS. 4A and 4B collectively illustrate a sequential diagram representing a direct discovery method for discovery and notification of EAS information profile across different EDNs with in the system shown in the FIG. 1, according to prior art;

FIGS. 5A and 5B collectively illustrate a sequential diagram representing a distributed discovery method for intelligently distributing discovery information and notifications related to EASs across EDNs within the system shown in FIG. 1, according to the embodiments as disclosed herein;

FIG. 6 illustrates a sequential diagram representing various steps of the distributed discovery and notification method for publishing EAS information profile across EDNs, according to embodiments as disclosed herein of;

FIG. 7 illustrates a sequential diagram representing various steps of the distributed discovery and notification method for retracting EAS information profile across the EDNs, according to embodiments as disclosed herein of;

FIG. 8 illustrates a sequential diagram representing various steps of the distributed discovery and notification method for updating EAS information profile across EDNs, according to embodiments as disclosed herein;

FIG. 9 illustrates a component diagram of the edge configuration server (ECS) for implementation of the distributed discovery and notifications of EAS information profile, according to embodiments as disclosed herein;

FIG. 10 illustrates a component diagram of the edge enabler server (EES) for implementation of the distributed discovery and notifications of EAS information profile, according to embodiments as disclosed herein; and FIG. 11 illustrates flow chart illustrating a method for providing a distributed discovery and notification of at least one EAS across EDNs, according to embodiments as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term. "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein achieve a method for providing a distributed discovery and notification of information related to an edge application server across a plurality of edge data networks (EDNs) in an edge data network system. The method includes receiving, by an edge configuration server (ECS), information of at least one edge application server (EAS) provided by a source edge enabler server (EES) from a plurality of EESs. The EAS is registered with the source EES. Further, the method includes determining, by the ECS, at least one target EES of the plurality of EESs based on the information about the at least one EAS. Further, the method includes sending, by the ECS, at least one notification to the at least one target EES. The at least one notification includes information about the source EES, and the information profile of the at least one EAS.

In an example, in the existing method, whenever the UE installs a new application, a request, for discovery information related to a new edge application server hosting the new application, is directed to the ECS. Therefore, in the existing method there is a need to connect to the ECS every time a new application is installed at the UE, which leads to high latency and delayed response time. Furthermore, according to existing methods, the ECS encounters a huge data traffic and processing which effects the efficiency of the overall edge computing network system.

Unlike conventional methods and systems, the proposed method can be used to obtain and selectively provide discovery information related to the edge application server to different EDNs in a distributed manner which results in lower latency and faster response tune for application services running on user equipment (UEs). The proposed method eliminates the need of keeping all the details, related to each edge application server (EAS) deployed in each EDN, within the ECS and further eliminates the need of the ECS for EAS's discovery information after the UE establishes connection with nearest EDN or source EDN. Thus, the proposed method achieves faster response time, efficient data processing and low latency in providing application services to the UEs which enhances user experience and maintain system efficiency without any increase in cost.

In the proposed methods, the discovery information and notification related to an edge application server is intelligently distributed to relevant EDNs, determined by the ECS, rather than piling discovery information of all EASs within the ECS.

Referring now to the drawings, and more particularly to FIGS. 1-11, where similar reference characters denote corresponding features consistently throughout the figures, there are shown preferred embodiments.

FIG. 1 illustrates a generic architecture of an edge data network system 100 in a distributed environment, according to the prior art. The edge data network system (100) includes a user equipment (UE) (102), a third-generation partnership project (3GPP) network (104), an edge data network (EDN) (106), and an edge configuration server (ECS) (116). The UE (102) includes an application client (AC) (108), and an edge enabler client (EEC) (110). The EDN (104) includes an edge application server (EAS) (112), and an edge enabler server (EES) (114).

In order to run an application within the UE (102), the AC (108) should connect to the EAS (112), via the EEC (110) and the EES (114), to avail the services of the application with the benefits of edge computing. The UE (102) connects to the EDN (106) via the ECS (116) as ECS is the centralized server which include information related to all the EDNs (106) within the system (110). The UE (102), the EDN (106) and the ECS (116) communicates with each other via the 3GPP network (104).

In an embodiment, the UE (102) can be, for example but not limited to a cellular phone, a tablet, a virtual reality device, a smart phone, a laptop, a personal digital assistant (PDA), a global positioning system, a multimedia device, a video device, an internet of things (IoT) device, and a smart watch. In an embodiment, the 3GPP network (104) maintains the communication standard according to protocols defined in the 3rd generation partnership project for mobile telecommunications.

According to an embodiment, the AC (108) is an application software installed in the UE which interacts with respective EAS (112) at the EDN for running the application with edge capabilities in the UE (102). The ECS (116) connects the UE to a nearest EDN (106) for leveraging edge application services. The functionalities of the ECS (116) includes providing edge configuration information to the EEC (110) to establish connection with the EDN (106) or EES (114). The edge configuration information includes information related to the EES (114) such as an identifier of the EES (114), a list of service areas served by the EAS (112) of the EES (114), an availability information of the EES (14). The communication between the ECS (116) and the EEC (110) constitutes "edge 4" of the system (110). The EEC (110) is configured to provide supporting functions needed for the AC (108). The functionalities of the EEC (110) include retrieval and provisioning of edge configuration information to enable the exchange of application data traffic between the EAS (112) and the AC (108), and discovery of EASs (112) available in the EDNs (106). The EAS (112) is the application server resident in the EDN (106) to perform the server functions. The EES (114) is configured to register information related to the EAS (112) and provide the information related to the EAS (112) to the EEC (110) in order to establish connection between the AC (108) and the EAS (112).

In an embodiment, whenever a user installs an application, the AC (108) corresponding to the installed application sends request to the EEC (110) for finding relevant EAS (112), this interaction between the AC (108) and the EEC (110) constitutes the "edge-5" of the system (100). The EEC (110) sends request to the ECS (116) for connection to the EDN (106) hosting the EAS (112). The ECS (116) determines a nearest EDN (106) hosting the requested EAS (112) and send the details of the EDN (106), or EES (114) of the EDB (106), to the EEC (110) via the 3GPP network (104). This communication between the EEC (110) and the ECS (116) constitutes the "edge-4" of the system (100). Upon receiving details of the EDN (106), the EEC (110) send service request to the EES (114) to connect to the EAS (112), this communication between the EEC (110) and the EES (114) constitutes the "edge-1" of the system (100). Upon receiving the service request, the EES (114) determines the requested. EAS (112), and directs the service request to the EAS (112). Upon receiving approval from the EAS (112), EES (114) connects the AC (108) with the EAS (112). This communication between the EES (114) and the EAS (112) constitutes the "edge-3" of the system (100). The AC (108) connects to the EAS (112) to exchange application data to run the services of the installed application with the benefits of edge computing via the 3GPP network (104). Further, the EDN (106) presently connected to the UE (102) is also referred as source EDN. The "edge-6" of the system (100) enables interactions between the ECS (116) and the EES (114) to enable registration of the edge configuration information related to the EES (114) with the ECS (116). The "edge-2" of the system (100) enables interactions between the EES (114) and the 3GPP Network (104) to enable access to 3GPP core network functions. The "edge-7" of the system (100) enables interactions between the EAS (112) and the 3GPP Network (104) to enable access to 3GPP core network functions. The "edge-8" of the system (100) enables interactions between the ECS (116) and the 3GPP Network (104) to enable access to 3GPP core network functions. Further, it shall be noted that only one UE (102) and one EDN (106) are shown in the FIG. 1 for the sake of brevity, however it will be apparent to a person having ordinary skills in the art that more than one UE (102) and one EDN (106) can also be present in the system (100).

Further, different steps involved in registering of EAS (112) with EES (114), registering EES (114) with ECS (116), and discovering and connecting to EAS (112) in a distributed manner are explained in detail in the FIGS. 2, 3, 6-11.

Further, as viewed based on the above discussion and illustration in FIG. 1, it is apparent that in the existing methods, whenever the UE (102) needs to connect to an EDN (106), the UE (102) needs to send a request to the ECS (116). This situation is further elaborated collectively in the FIGS. 4A and 4B, with respect to discovering and connecting to EAS in different EDNs following an existing method of direct discovery of EAS information along with problems associated with the direct discovery method.

FIG. 2 illustrates a sequential diagram representing a method (200) for registration of multiple EASs (112) with an EES (114) in the edge data network system (100), according to the embodiments as disclosed herein.

As shown in the FIG. 2, there are three edge application servers EAS1 (112A), EAS2 (112B), and EAS3 (112C), and there are two edge enabler servers EES1 (114A), and EES2 (114B). The EAS1 represents an application (App1), EAS2 represents an application (App2) and EAS3 represents an application (App3).

At step 202, the EAS1 (112A) sends a registration request to the EES1 (114A). At step 204, the EES1 (114A) registers the EAS1 and sends a registration response to the EAS1 (112A). The registration response includes a successful registration of the EAS1 (112A) with the EES1 (114A). Similarly steps 206-216 represents registration of EAS2 and EAS3 with EES1 and EES2. Upon successful registration of the EAS1 (112A), EAS2 (112B), and EAS3 (112C) with the EES1 (114A) and the EES2 (114B), the EES1 (114A) stores EAS information profile related to both EAS1 (112A) and EAS2 (112B), and the EES2 (114B) stores EAS information profile related to both EAS2 (112B) and EAS3 (112C). The EES1 (114A) may also be referred as source EES for the EAS1 (112A) and the EAS2 (112B). Similarly, EES2 (114B) may also be referred as source EES for the EAS2 (112B) and the EAS3 (112C). Further, the EAS information profile comprises a list of service areas served by the EAS (112), an endpoint of the EAS (112), a registration information of the EAS (112), and an identifier of the at least one EAS (112).

In an embodiment, the EAS2 (112B) representing App 2, may be the same server that registers with both EES1 (114A) and EES2 (114B). In an alternate embodiment, it may be different EASs that register with EES1 (114A) and EES2 (114B), while representing the same application, App 2.

FIG. 3 illustrates a sequential diagram representing a method (300) for registration of multiple EESs (114) with an ECS (116), according to the embodiments as disclosed herein.

As shown in the FIG. 3, there are two edge enabler servers the EES1 (114A) and the EES2 (114B), and the ECS (116)

are present. As previously shown in FIG. 2 EAS1 (112A), hosting an application1 (App1), and EAS2 (112B), hosting an application2 (App2), are registered with the EES1 (114A), and EAS2 (112B) and EAS3 (112C), hosting an application3 (App3), are registered with the EES2 (114B).

At step 302, EES1 (114A) sends a registration request to the ECS (116). The registration request contains EAS information profile including details of the available edge application servers (EAS1 (112A) and EAS2 (112B)) along with the details of the source edge enabler server, i.e. EES1 (114A) and the EDN (106) that includes the EES1 (114A), the EAS1 (112A), and the EAS2 (112B).

At step 304, ECS (116) upon receiving the EES1 (114A) registration request registers the EES1 (114A) and stores the information provided in the registration request. Additionally, the ECS (116) may also perform an authentication check on the EES1 (114A) before registering the EES1 (114A), and proceeds with the registration only after successful authentication of the EES1 (114A).

At step 306, EES2 (114B) sends a registration request to the ECS (116). The registration request contains EAS information profile including details of the available edge application servers (EAS2 (112B) and EAS3 (112C)) along with the details of the source edge enabler server, i.e. EES2 (114B) and the EDN (106) that includes the EES2 (114B), the EAS2 (112B), and the EAS3 (112C).

At step 308, ECS (116), upon receiving the EES2 (114B) registration request, registers the EES2 (114B) and stores the information provided in the registration request. Additionally, the ECS (116) may also perform an authentication check on the EES2 (114B) before registering the EES2 (114B), and proceeds with the registration only after successful authentication of the EES2 (114B).

FIGS. 4A and 4B collectively illustrate a sequential diagram representing a direct discovery method (400) for discovery and notification of EAS information profile across different EDNs (106) in the system (100), according to prior art. The direct discovery method (400) is used in the existing methods of discovering EAS information profile and has few drawbacks in terms of latency and response time, however the shortcomings associated with the direct discovery method (100) will get apparent as we proceed further with the explanation of the direct discovery method (400).

At step 402, the EEC (110) sends a service provisioning request to the ECS (116) for fetching information related to EESs (114) which have the EAS for the App1 and App2 installed at the UE (102). The ECS (116) is a centralized server which contains information of all EESs (114) and their respective EASs (112) along with information of the EDN (106) they belong to. At step 404, ECS (116) sends a service provisioning response including the details related to EES1 (114A) hosting both EAS1 (112A), and EAS2 (112B), and details related to the EES2 (114B) hosting EAS2 (112B). The EEC (110) may choose as to which EES (114), the UE (102) should be connected for each application. For example, the EEC (110) may choose EES1 (114A) for App1 and EES2 (114B) for App2, or the EEC (110) may choose EES1 (114A) for both App1 and App2. Let's consider EEC (110) chose EES1 (114A) for App1 and EES2 (114B) for App2.

Upon successfully fetching the information related to the relevant EESs (114) at step 404, at step 406 the EEC (110) sends an EAS1 discovery request to the EES1 (114A) for connecting to the EAS1 (112A) to avail services of the App1. At step 408, the EES1 (114A) sends an EAS1 discovery response to the EEC (110) and a connection is established between the AC (108) and the EAS1 (112A). At step 410, the EEC (110) sends an EAS2 discovery request to the EES2 (114B) for connecting to the EAS2 (112B) to avail services of the App2. At step 412, the EES2 (114B) sends an EAS2 discovery response to the EEC (110) and a connection is established between the AC (108) and the EAS2 (112B).

In an embodiment, the UE (102) installs a new application (App 3), and therefore, at step 414, the EEC (110) again sends another service provisioning request to the ECS (116) for fetching information related to the EES (114) which have the EAS for the App3 installed at the UE (102). At step 416, the ECS (116) sends a service provisioning response including the details related to EES2 (114B) hosting EAS3 (112C) which represents App3.

Upon successfully fetching the information related to the EES2 (114B), at step 418 the EEC (110) sends an EAS3 discovery request to the EES2 (114B) for connecting to the EAS3 (112C) to avail services of the App3. At step 408, the EES2 (114B) sends an EAS3 discovery response to the EEC (110) and a connection is established between the AC (108) and the EAS3 (112C).

Therefore, in the existing direct discovery method (400), the ECS (116) encounters a huge traffic data because of storage and management of all the information related to multiple EDNs (106) and their associated EESs (114) and EASs (112). Therefore, this effects the overall performance efficiency of the edge computing network system (100). Further, the direct discovery method (400) involves multiple interactions of the EEC (110) with ECS (116) for every new EAS discovery leading in high latency and slow response time, which impacts the user experience.

The above noted short comings are addressed and resolved by a distributed discovery and notification method (500) illustrated collectively in FIGS. 5A and 5B.

FIGS. 5A and 5B collectively illustrate a distributed discovery method (500) for intelligently distributing discovery information and notifications related to EASs (112) across EDNs (106) in the edge data network system (100), according to the embodiments as disclosed herein.

In an embodiment, the EAS registration process and EES registration process explained in FIG. 2 and FIG. 3 respectively, are also applicable for the distributed discovery and notification method (500), and the steps in the method 500 are steps followed by the EAS registration and the EES registration process. The ECS (116) has details of the registered EESs along with their respective EASs.

In an embodiment, the steps in the method 500 are steps followed by update of the EES registration information, which may be due to update of the EAS registration information.

At step 502, the ECS (116) determines one or more target EESs (114B) with respect to an EAS information profile provided by a source EES (114A). According to an example embodiment, the EES1 (114A) gets registers with the ECS (116) and publishes EAS information profile related to the EAS1 (112A), now the ECS (116) determines that the information of availability of the EAS1 (112A) at the source EES1 (114A) may also be required by the target EES2 (114B). In a non-limiting example, the determination, by the ECS (116), of the one or more target EESs (114B) is based on an overlap between a service area of the EAS1 (112A) and a location of the target EES2 (114B), which means if the location of the target EES2 (114B) falls in the service area of the EAS1 (112A) then ECS (116) considers EES2 (114B) as the target EES. In another non-limiting example, the determination, by the ECS (116), of the one or more target EESs (114B) is based on the service area of the EAS1 (112A) and a service area of the target EES2 (114B), which means if the service area of target EES2 (114B) overlaps with the service area of the EAS1 (112A) then ECS (116) considers EES2 (114B) as the target EES. According to an example embodiment, the ECS (116) may determine EES1 (114A) as the target EES for EAS information profile related to the EAS3 (112C) registered at the source EES2 (114B). However for the sake of brevity, hereinafter the target EESs are denoted by (114B) and the source EESs are denoted by (114A).

At step 504, the ECS (116) sends a notification including details of EAS3 information to the EES1 (114A) as target EES, and at step 506, the ECS (116) receives an acknowledgment response form the EES1 (114A) for successful reception of the notification. At step 508, the ECS (116) sends a notification including details of EAS1 information to the EES2 (114B) as target EES, and at step 510, the ECS (116) receives an acknowledgment response form the EES2 (114B) for successful reception of the notification. Therefore, whenever a source EES (114A) registers with the ECS (116) and publishes EAS information profile, ECS (116) determines one or more target EESs (114B) with respect to the published EAS and renders the availability information of the EAS (112) to the one or more target EESs (114B). At step 512, the AC (108) send EAS connect request to the EEC (110) to connect to the EASs (112) corresponding to the installed applications.

In an embodiment, the service area of the EAS (112) or the service area of the EES (114) can be defined as, but not limited to, a geographic area serviceable by the EAS (112) or the EES (114), a list of cell IDs associated with the EDN (106) which is hosting the EAS (112) or the EES (114), a list of tracking area identifiers (TAIs) associated with the EDN (106) which is hosting the EAS (112) or the EES (114), a list of data network access identifiers (DNAIs) associated with the EDN (106) which is hosting the EAS (112) or the EES (114) or a combination thereof.

In an alternate embodiment, at step 512, the EEC (110) may determine to obtain service provisioning information based on an internal or an external trigger, other than the AC requesting to connect to an EAS.

At step 514, the EEC (110) sends a service provisioning request to the ECS (116). At step 516, the ECS (116) shares details of a nearest EES, for example, but not limited to, EES1 (114A), to the UE (102).

At step 518, the EEC (110) sends EAS discovery requests to the nearest EES (114) for applications (App1, and App2) installed at the UE (102). At step 520, the nearest EES1 (114A) provides the EAS discovery response to the EEC (110) by fetching the notification related to the EASs (112A, and 112B) availability at EES1 (114A) and EES2 (114B) from its database. Further, at step 522, EEC (110) sends a new EAS discovery request to the nearest EES (114) for newly installed application (App3). At step 524, the EES1 (114) provides the EAS discovery response to the EEC (110) by fetching the notification related to the EAS3 (112C) availability at the EES2 (114B) from the database. At 546, the EEC (110) sends the at least one notification of the EAS3 discovery to the AC (108).

Accordingly, the distributed discovery method (500) intelligently distributes the EAS information profile and notification among the relevant EDNs (106), and hence reduces the number of interactions with the ECS (116) for every new EAS discovery. In the proposed direct discovery method (500), the UE (102) needs to interact with the nearest EDN (106) for any EAS discovery rather than interacting with the ECS (116), which results in lower latency and faster response time. Further, the data traffic at the ECS (116) also reduces which increases the efficiency of the ECS (116). Furthermore, ECS (116) no more needs to store all the information related to multiple EASs across multiple EDNs (106), instead the ECS (116) only needs to do selective distribution of the EAS information profile across the EDNs (106) within the system (100).

FIG. 6 illustrates a sequential diagram (600) representing various steps of the distributed discovery and notification method for publishing EAS information profile across EDNs (106), according to embodiments as disclosed herein of.

In an embodiment, the source EES (114A) sharing the information about a newly registered EAS (112) with the ECS (116) is illustrated in the FIG. 2. The source EES (114A) is already registered with the ECS (116).

At step 602, the EAS (112) sends a registration request to the source EES (114A). The registration request includes EAS information profile about the EAS (112), such as location or service areas the EAS (112) needs to be available, the time of the day, performance requirements, etc.

At step 604, the source EES (114A) checks if the EAS (112) is authorized to register or not. At step 606, if the EAS (112) is authorized, the source EES (114A) registers the EAS (112) and sends a registration response indicating successful registration to the EAS (112).

At step 608, the source EES (114A) sends a publish request to the ECS (116). The publish request contains the EAS information profile including details of the EAS (112) along with the details of the source EES (114A) and the source EDN (106A).

In an embodiment, the publish request sent at step 608 is compliant with the common API framework (CAPIF).

At step 610, upon receiving the publish request, the ECS (116) checks if the source EES (114A) is authorized to publish the EAS information profile or not. If the source EES (114A) is authorized, the ECS (116) stores the EAS information profile provided in the publish request. At step 612, the ECS (116) sends a publish response to the source EES (114A) indicating success or failure of the publish request.

At step 614, the ECS (116) processes the EAS information profile received from the source EES (114A), and determines responsible target EESs (114B) and target EDNs (106B) for the newly available EAS. In a non-limiting example, the determination, by the ECS (116), of the one or more target EESs (114B) or target EDNs (106B) is based on the service area of the EAS1 (112A) and the location of the target EES2 (114B), which means if the location of the target EES2 (114B) falls in the service area of the EAS1 then ECS (116) considers EES2 as the relevant target EES (114B).

At step 616, the ECS (116) notifies all target EESs (114B), as determined in step 614. The notification includes the information about the newly available EAS, as received in the publish request from the source EES (114A), information about the source EES (114A) and the source EDN (106A).

At step 618, the target EESs (114B), upon receiving the notification from the ECS (116), stores the information to later facilitate the discovery of the published EAS (112). At step 620, the target EESs (114B) notifies the edge enabler clients (110), which subscribed for notifications about the EAS (112), for the EAS related information as received in step 616. At step 622, the EEC (110) sends the at least one notification to the AC (108).

FIG. 7 illustrates a sequential diagram (700) representing various steps of the distributed discovery and notification method for retracting EAS information profile from the EDN (106), according to embodiments as disclosed herein of.

In an embodiment, the source EES (114A) shares the information about an EAS (112), which is no longer registered with the EES (114A), to the ECS (116). The source EES (114A) is already registered with the ECS (116) and has previously shared EAS information profile about the EAS (112) being available at the EES (114A).

At step 702, the EAS (112) sends a de-registration request to the source EES (114A).

At step 704, the source EES (114A) checks if the EAS (112) is authorized to de-register or not. At step 706, the source EES (114A) de-registers the EAS (112) and sends a de-registration response indicating successful de-registration to the EAS (112), if the EAS (112) is authorized.

At step 708, the source EES (114A) sends an update request to the ECS (116) for updating about the de-registration of the EAS (112) at the source EES (114A) so that the target EESs (114B) can be notified about unavailability of the EAS (112) at the source EES (114A). The update request may contain the details of the EAS (112) along with the details of the source EES (114A) and the source EDN (106A).

At step 710, the ECS (116) upon receiving the update request checks if the source EES (114A) is authorized to update the EAS information profile or not. If the source EES (114A) is authorized, the ECS (116) updates the information provided in the update request. At step 712, the ECS (116) sends an update response to the source EES (114A) indicating success or failure of the request.

At step 714, the ECS (116) processes the update related to the EAS information profile received from the source EES (114A), and determines target EESs (114B), and target EDNs (106B), which should be updated with unavailability of the EAS (112) at the source EES (114A).

At step 716, the ECS (116) sends a notification to all target EESs (114B) about the unavailability of the EAS (112), as received in the update request from the source EES (114A), and information about the source EES (114A) and the source EDN (106A).

At step 718, the target EES (114B), upon receiving the notification from the ECS (116), updates the stored EAS information profile related to the EAS (112). At step 720, the target EES (114B) notifies the EEC (110), which subscribed for notifications about the EAS (112), for unavailability of the EAS (112). At step 722, the EEC (110) sends the at least one notification to the AC (108) to inform about the unavailability of the EAS (112).

FIG. 8 illustrates a sequential diagram (800) representing various steps of the distributed discovery and notification method (500) for updating EAS information profile across EDNs (106), according to embodiments as disclosed herein.

In an embodiment, the source EES (114A) shared the information about the EAS (112), which updated its registered information such as availability information, with the ECS (116). The source EES (114A) is already registered with the ECS (116) and has previously shared the information about the EAS being available.

At step 802, the EAS (112) sends a registration update request to the source EES (114A). At step 804, the source EES (114A) checks if the EAS (112) is authorized to update registration information or not. In an embodiment, the registration update request includes updated details of the EAS (112) for example, but not limited to, updated list of service areas of the EAS (112), updated availability of the EAS (112), updated configuration to support different data quality and/or the like.

At step 804, the source EES (114A) updates the registration information of the EAS (112) if the EAS (112) is authorized, and at step 806 the source EES (114A) sends a registration update response indicating successful registration update to the EAS (112).

At step 808, the source EES (114A) sends an update request to the ECS (116) so that the relevant target EESs (114B) can get notified about the updated registration information of the EAS (112). The update request contains the updated details of the EAS (112) along with the details of the source EES (114A) and the source EDN (106A).

At step 810, upon receiving the update request, the ECS (116) checks if the source EES (114A) is authorized to update EAS information profile or not. If the source EES (114A) is authorized, the ECS (116) updates the previously stored EAS information profile according to the updated details of the EAS (112) provided in the update request, and stores the updated EAS information profile within its database. At step 812, the ECS (116) sends an update response to the source EES (114A) indicating success or failure of the request.

At step 814, the ECS (116) processes the updated EAS information profile received from the source EES (114A), and determines target EESs (114B) and target EDNs (106A), which should be updated about the updated EAS information profile of the EAS (112).

At step 816, the ECS (116) notifies the determined target EESs (114B) about the updated information of the EAS (112), as received in the update request from the source EES (114A), along with information about the source EES (114A) and the source EDN (106A).

At step 818, upon receiving the notification from the ECS (116), the target EESs (114B) update the stored EAS information profile of the EAS (112) within its database. At step 820, the target EESs (114B) notify the EECs (110), which subscribed for notifications about the EAS (112) about the updated EAS information profile. At step 822, the EEC (110) sends the at least one notification to the AC (108) to inform about the update in the information profile of the EAS (112).

FIG. 9 illustrates a component diagram of the edge configuration server (ECS) (900) for implementation of the distributed discovery and notifications of EAS information profile, according to embodiments as disclosed herein. The ECS (900) is an example of the ECS (116) as shown in FIG. 1.

The ECS (900) includes a processor (910), a communication interface (920), a memory (930), a distributed discovery and notification controller (940), a resource management controller (950), a security controller (960), and a database (970). The components of the ECS (900) provided herein may not be exhaustive and that the ECS (900) may include more or fewer components than that of depicted in FIG. 9. Further, two or more components may be embodied in one single component, and/or one component may be configured using multiple sub-components to achieve the desired functionalities. Some components of the ECS (900) may be configured using hardware elements, software elements, firmware elements and/or a combination thereof.

The processor (910) is coupled with the memory (930), the communication interface (920), the distributed discovery and notifications controller (940), the resource management controller (950), the security controller (960), and the database (970). The processor (910) is configured to execute instructions stored in the memory (930) and to perform various processes. The communication interface (920) is configured for communicating internally between internal hardware components and with external devices via one or more networks.

The processor 910 may include one or more processing units (e.g., in a multi-core configuration).

The memory (930) stores instructions to be executed by the processor (910). The memory (930) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (930) may, in some examples, be considered a non-transitory storage medium. The term "non-transitory" may indicate that the storage medium is not embodied in a carrier wave or a propagated signal. However, the term "non-transitory" should not be interpreted that the memory (930) is non-movable. In some examples, the memory (930) can be configured to store larger amounts of information than the memory. In certain examples, a non-transitory storage medium may store data that can, over time, change (e.g., in Random Access Memory (RAM) or cache).

The processor (910) may also be operatively coupled to the database (970). The database (970) is any computer-operated hardware suitable for storing and/or retrieving data. The database (970) may include, but not limited to, a storage area network (SAN) and/or a network attached storage (NAS) system. In other embodiments, the database (970) may be external to the ECS (900) and may be accessed by the ECS (900) using a storage interface. The storage interface is any component capable of providing the processor (910) with access to the database (970).

In an embodiment, the processor (910), is configured to receive registration request from multiple EESs (114), or EECs (110) via the communication interface (920). The received request is authenticated by the security controller (930) as directed by the processor (920) for facilitating secure data communication. Upon successful registration of the EESs (114) and EECs (110), the processor (910) instructs storage of the registration details of the EESs (114) and EECs (110) in the database (970). The details of EDNs (106) and EASs (112) associated with the EESs (114) or EECs (110) are also stored in the database (970), for example, but not limited to EAS information profile of EAS (112) published at a source EAS (114A) which is registered with the ECS (900). The EAS information profile includes a list of service areas served by the EAS (112), an endpoint of the EAS (112), a registration information of the EAS (112) with the source EES (114A), and an identifier of the at least one EAS (112).

In an embodiment, the processor (910) is further configured to facilitate provisioning of the details related to the EESs (114) along with associated EASs (112) and EDNs (106) via the resource management controller (950). The processor (910) is further configured to determine, via the distributed discovery and notification controller (940), relevant target EESs (114B) with respect to an EAS information profile associated with availability of EAS (112) at source EES (114A). The distributed discovery and notification controller (940) is further configured to distribute the EAS information profile across the target EESs (114B) via the communication interface. In an example embodiment, the distributed discovery and notification controller (940) determines the relevant target EESs (114B) based on overlapping of service area of the EAS (112) and the location of the target EESs (114B), which means if the location of the target EES (114B) falls in the service area of the EAS (112) then ECS (116) considers the target EES as relevant target EESs to notify about the EAS information profile of the EAS (112). In an additional or alternate embodiment, the distributed discovery and notification controller (940) determines the relevant target EESs (114B) based on overlapping of service area of the EAS (112) and the service area of the target EESs (114B), which means if the service area of the target EES (114B) falls in the service area of the EAS (112) then ECS (116) considers the target EES as relevant target EESs to notify about the EAS information profile of the EAS (112).

The embodiments disclosed herein can be implemented using at least one software program running on at least one hardware device and performing network management functions to control the elements.

FIG. 10 illustrates a component diagram of the edge enabler server (EES) (1000) for implementation of the distributed discovery and notifications of EAS information profile, according to embodiments as disclosed herein. The EES (1000) is an example of the EES (114) as shown in FIG. 1.

The EES (1000) includes a processor (1010), a communication interface (1020), a memory (1030), a distributed discovery and notification controller (1040), a resource management controller (1050), a security controller (1060), and a database (1070). The components of the EES (1000) provided herein may not be exhaustive and that the EES (1000) may include more or fewer components than that of depicted in FIG. 10. Further, two or more components may be embodied in one single component, and/or one component may be configured using multiple sub-components to achieve the desired functionalities. Some components of the EES (1000) may be configured using hardware elements, software elements, firmware elements and/or a combination thereof.

The processor (1010) is coupled with the memory (1030), the communication interface (1020), the distributed discovery and notifications controller (1040), the resource management controller (1050), the security controller (1060), and the database (1070). The processor (1010) is configured to execute instructions stored in the memory (1030) and to perform various processes. The communication interface (1020) is configured for communicating internally between internal hardware components and with external devices via one or more networks.

The processor (1010) may include one or more processing units (e.g., in a multi-core configuration).

The memory (1030) stores instructions to be executed by the processor (1010). The memory (1030) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (1030) may, in some examples, be considered a non-transitory storage medium. The term "non-transitory" may indicate that the storage medium is not embodied in a carrier wave or a propagated signal. However, the term "non-transitory" should not be interpreted that the memory (1030) is non-movable. In some examples, the memory (1030) can be configured to store larger amounts of information than the memory. In certain examples, a non-transitory storage medium may store data that can, over time, change (e.g., in Random Access Memory (RAM) or cache).

The processor (1010) may also be operatively coupled to the database (1070). The database (1070) is any computer-operated hardware suitable for storing and/or retrieving data. The database (1070) may include, but not limited to, a storage area network (SAN) and/or a network attached storage (NAS) system. In other embodiments, the database (1070) may be external to the EES (1000) and may be accessed by the EES (1000) using a storage interface. The storage interface is any component capable of providing the processor (1010) with access to the database (1070).

In an example embodiment, the EES (1000) may act as a source EES (114A) hosting multiple EASs (112). In order to facilitate EES functionality as the source EES (114A), the processor (1010), is configured to receive registration request from multiple EASs (112) via the communication interface (1020). The received registration request is authenticated by the security controller (1030) as directed by the processor (1020) for facilitating secure data communication. Upon successful authentication, the EASs (112) is registered with the EES (1000). The processor (1010) is further configured to instruct storage of the registration details of the EASs (112) in the database (1070). The registration details of the EAS (112) includes a list of service areas served by the EAS (112), a location of the EAS (112), a registration information of the EAS (112) with the source EES (114A), an availability information of the EAS (112) registered with the source EES (114A), a change in availability information of the EAS (112) registered with the source EES (114A), and an identifier of the EAS (112).

In an embodiment, the EES (1000) may act as a target EES (114B) which is not actively connected to the EAS (112), however deserves to get notification about availability of the EAS (112) at a source EES (114A). In order to facilitate the functionality of the EES (1000) as the target EES, the processor (1010) is configured to receive, via the distributed discovery and notification controller (1040), a notification related to EAS information profile of EAS (112) along with associated source EES information from the ECS (900).

In an embodiment, the processor (1010) is configured to receive service provisioning request for EASs (112) from multiple EECs (110) via the communication interface (920). The received service provisioning request is authenticated by the security controller (1030) as directed by the processor (1020) for facilitating secure data communication. Upon successful authentication, the processor (1010) is further configured to facilitate provisioning of the details related to the EASs (112) requested by the EEC (110) along with information of associated source EDN (106A) via the resource management controller (1050). The processor (1010) is further configured to determine, via the distributed discovery and notification controller (1040), relevant EECs (110) who have subscribed for notification related to the EAS (112) and notify the relevant EECs (110) about the EAS information profile associated with availability of EAS (112) at source EES (114A). The processor (1010) is further configured to instruct storage of the EAS provisioning details of the EASs (112) in the database (1070).

The embodiments disclosed herein can be implemented using at least one software program running on at least one hardware device and performing network management functions to control the elements.

FIG. 11 is a flow chart (S1100) illustrating a method for providing a distributed discovery and notification of at least one EAS (112) across EDNs (106), according to an embodiment as disclosed herein. The steps (S1102-S1106) are performed by the processor (910).

At S1102, the method includes receiving an information profile of at least one EAS (112) provided by a source EES (114A) from the plurality of EESs (114). The information profile about the at least one EAS (112) comprises at least one of a list of service areas served by the at least one EAS (112), an endpoint of the at least one EAS (112), a registration information of the at least one EAS (112) with the source EES (114A), and an identifier of the at least one EAS (112).

At S1104, the method includes determining at least one target EES (114B) from the plurality of EESs (114) based on the information profile about the at least one EAS (112).

At S1106, the method includes sending at least one notification to the at least one target EES (114B). The at least one notification includes information about the source EES (114A), and the information profile of the at least one EAS (112) provided by the source EES (114A).

The various actions, acts, blocks, steps, or the like in the flow chart (S1100) may be performed in the order presented, in a different order or simultaneously. Further, in some embodiments, some of the actions, acts, blocks, steps, or the like may be omitted, added, modified, skipped, or the like without departing from the scope of the invention The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by an edge configuration server (ECS), for distributed discovery and notifications for edge computing, the method comprising:

receiving information on at least one edge application server (EAS) provided by a source edge enabler server (EES) from a plurality of EESs;

determining at least one target EES from the plurality of EESs based on the information on the at least one EAS; and transmitting at least one notification to the at least one target EES, wherein the at least one notification includes information on the source EES, the information on the at least one EAS provided by the source EES, and information on a source edge data network (EDN) corresponding to the source EES, wherein the information on the at least one EAS comprises at least one of a list of service areas served by the at least one EAS, an endpoint of the at least one EAS, registration information of the at least one EAS, availability information of the at least one EAS, or an identifier of the at least one EAS, and wherein determining the at least one target EES from the plurality of EESs comprises:

determining, whether a service area of the at least one EAS overlaps with at least one of a location or a service area of the at least one target EES; and selecting the at least one target EES based on the determination that the service area of the at least one EAS overlaps with the at least one of the location or the service area of the at least one target EES.

2. The method of claim 1, wherein the information on the source EES comprises an identifier of the source EES.

3. The method of claim 1, wherein the at least one notification from the ECS is transferred from the at least one target EES to at least one edge enabler client (EEC) corresponding to each of the at least one target EES.

4. The method of claim 3, wherein the at least one notification from the ECS is transferred from the at least one EEC to an application client.

5. An edge configuration server (ECS) for distributed discovery and notification for edge computing, the ECS comprising:

memory, a processor, and a distributed discovery and notification controller communicatively connected to the memory and the processor, the distributed discovery and notification controller configured to:

receive information on at least one edge application server (EAS) provided by a source edge enabler server (EES) from a plurality of EESs, determine at least one target EES from the plurality of EESs based on the information on the at least one EAS, and transmit at least one notification to the at least one target EES, wherein the at least one notification includes information on the source EES, the information on the at least one EAS provided by the source EES, and information on a source edge data network (EDN) corresponding to the source EES, wherein the information on the at least one EAS comprises at least one of a list of service areas served by the at least one EAS, an endpoint of the at least one EAS, registration information of the at least one EAS, availability information of the at least one EAS, or an identifier of the at least one EAS, and wherein the distributed discovery and notification controller is further configured to:

determine whether a service area of the at least one EAS overlaps with at least one of a location or a service area of the at least one target EES; and select the at least one target EES based on a determination that the service area of the at least one EAS overlaps with the at least one of the location or the service area of the at least one target EES.

6. The ECS of claim 5, wherein the information on the source EES includes an identifier of the source EES.

7. The ECS of claim 5, wherein the at least one notification from the ECS is transferred from the at least one target EES to at least one edge enabler client (EEC) corresponding to each of the at least one target EES.

8. The ECS of claim 7, wherein the at least one notification from the ECS is transferred from the at least one EEC to an application client.

* * * * *